US010250704B2

United States Patent
Kurth et al.

(10) Patent No.: US 10,250,704 B2
(45) Date of Patent: Apr. 2, 2019

(54) REGISTRATION DURING DOWNTIME

(71) Applicant: Experian Health, Inc., Franklin, TN (US)

(72) Inventors: Kassandra Marie Kurth, Nashville, TN (US); Edmond Chase Pilkington, Rockvale, TN (US); Abby Curtis, Nashville, TN (US)

(73) Assignee: EXPERIAN HEALTH, INC., Franklin, TN (US)

( * ) Notice: Subject to any disclaimer, the term of this patent is extended or adjusted under 35 U.S.C. 154(b) by 364 days.

(21) Appl. No.: 15/081,537

(22) Filed: Mar. 25, 2016

(65) Prior Publication Data
US 2017/0277724 A1 Sep. 28, 2017

(51) Int. Cl.
*G06F 17/30* (2006.01)
*H04L 29/08* (2006.01)

(52) U.S. Cl.
CPC ........ *H04L 67/20* (2013.01); *G06F 17/30578* (2013.01)

(58) Field of Classification Search
CPC .............................. G06F 19/322; H04L 67/20
See application file for complete search history.

(56) References Cited

U.S. PATENT DOCUMENTS

2016/0140298 A1* 5/2016 Bell ...................... G06F 19/322
424/133.1

\* cited by examiner

*Primary Examiner* — Etienne P Leroux
(74) *Attorney, Agent, or Firm* — Merchant & Gould

(57) ABSTRACT

A downtime registration service is discussed herein that enables client systems that rely on electronic record management systems to continue generating records during a downtime event for the electronic record management system without relying on a workaround that requires temporary identifiers or reentry of data. The downtime registration system improves the efficiency and accuracy of electronic systems because workarounds that involve using temporary identifiers, or reentering data collected during the downtime, increase the amount of work done and the chance for errors to be introduced into the records. The client systems are in communication with an outside facility providing advanced services, which track the records generated during normal operation (i.e., not downtime) so that new records created during downtime properly reuse existing record identifiers or assign new identifiers that correspond to the clients' record keeping policies.

19 Claims, 6 Drawing Sheets

REGISTRATION DURING DOWNTIME

BACKGROUND

A server downtime event (e.g., for database synchronization, system updates, software patches, server failures) can result in operators relying on work-arounds that will force the operators to reenter data (thus, introducing more possibilities for inaccuracies and inconsistencies), and duplicate effort, once the server downtime event is over. Often, local services that use interconnected resources from the server experiencing the downtime event are not available to operators during downtime. Account registration and lookup are services that are frequently not offered during a server downtime event, and because the account data are often used as key values in databases, services, local or remote, that rely on the account data, although potentially accessible to operators, are also not provided or provided in a reduced capacity.

BRIEF SUMMARY

The present disclosure provides systems and methods for account registration and management services during a server downtime event for a local system interconnected with at least one remote system. The remote system provides enhanced services to the local system during both uptime and downtime, and during a downtime event will accept registration information for an account that are stored by the remote system for postback into the local system once downtime ends. The remote system enables the lookup of account information associated with an individual for whom the operator is attempting to admit during downtime, which allows for greater continuity of records for the individual, reduces the risk of incorrect identifier selection, and less memory being used for multiple accounts for the same individual.

The systems and methods provided in the present disclosure overcome problems inherent to internet-based systems by providing enhanced services to clients during a downtime event without relying on reentering data once the downtime event has concluded. Additionally, the amount of data transmitted between the systems or stored by a given system to affect a work-around is reduced during a downtime event, further improving the operation of the systems themselves.

Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention. In the drawings.

DETAILED DESCRIPTION

Figure 1:
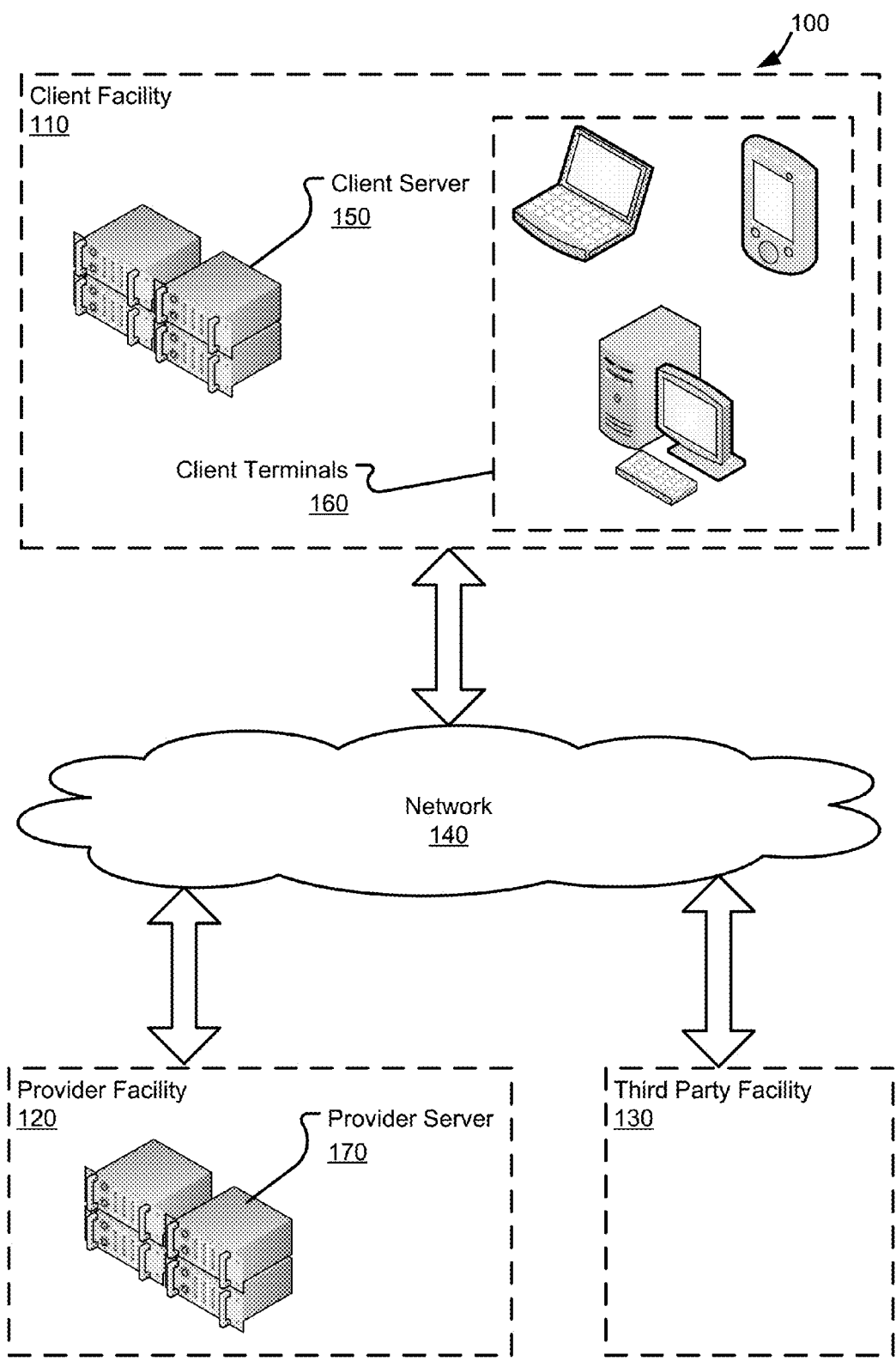
FIG. 1 is a block diagram of an example layout of facilities enabled to participate in registration during downtime.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The present disclosure provides systems and methods for account registration and management services during a server downtime event for a local system interconnected with at least one remote system. The remote system provides enhanced services to the local system during both uptime and downtime, and during a downtime event will accept registration information for an account that are stored by the remote system for postback into the local system once downtime ends. The remote system enables the lookup of account information associated with an individual for whom the operator is attempting to admit during downtime, which allows for greater continuity of records for the individual, reduces the risk of incorrect identifier selection, and less memory being used for multiple accounts for the same individual.

The systems and methods provided in the present disclosure overcome problems inherent to internet-based systems by providing enhanced services to clients during a downtime event without relying on reentering data once the downtime event has concluded. Additionally, the amount of data transmitted between the systems or stored by a given system to affect a work-around is reduced during a downtime event, further improving the operation of the systems themselves.

Various types identifiers for records are used herein with which one of ordinary skill in the art will be familiar. Identifiers generally fall within one of three categories: global local, and event. Global identifiers are those identifiers that are used between parties to identify an entity or subject of a record, and examples include, but are not limited to: Vehicle Identification Numbers (VIN), Social Security Numbers (SSN), enterprise Medical Record Numbers (eMRN), stock keeping unit (SKU), etc. Local identifiers are those identifiers that are used by a single party to identify an entity or subject of a record (which a second party may adopt as their own local identifier), and examples include, but are not limited to: a customer account number, a student identification number (SIN), a Medical Record Number (MRN), internal part number, etc. Event identifiers are those identifiers that are used by a single party to identify an interaction with an entity or subject of a record, for example, when a customer brings their vehicle in for multiple oil changes, a dealership may track each visit with a separate visit number while using the same customer account number and VIN. Similarly, a student identified by SSN and SIN by a school may have test numbers for each test that he takes, a patient identified by eMRN and MRN by a hospital may have an account number for each medical procedure, and an article of manufacture identified by SKU and part number by a manufacturer may also be identified by a batch or sale number.

FIG. 1 is a block diagram of an example layout 100 of facilities enabled to participate in registration during downtime. A client facility 110 is in communication via a network 140 with a provider facility 120 and a third party facility 130. The provider facility 120 may also be in communication with the third party facility 130 via the network 140 and provides enhanced services to the systems at the facilities in which it is in communication. As will be appreciated, more than one third party facility 130 may be in communication with the client facility 110 and/or the provider facility 120.

The client facility 110 comprises client servers 150 and client terminals 160 that are in communication via a Local Area Network (LAN). In various aspects, the LAN may be wired, wireless, or a combination thereof and client terminals 160 located physically outside of the client facility 110 may be connected to the network 140 via a Virtual Private Network (VPN) or other remote access system known to those of ordinary skill in the art. As will be appreciated, a client facility 110 may be spread across several buildings and geographic locations, such as, for example, a college campus, or a law firm with offices in multiple cities, so long as each location is tied into a shared client server 150 or series of servers acting as a client system to control and manage the creation of records. Although illustrated in FIG. 1 as being managed within the client facility 110, in some aspects, the client server 150 may be provided remotely via "the cloud" as a virtual server on hardware that is physically managed by a third party, or a client facility 110 may rely on a master client terminal 160 acting as a client server 150.

The client server 150 provides centralized management of records within the client facility 110, for example, managing databases of customers, of matters, or inventory that client terminals 160 access in common from the client server 150. During normal operation (i.e., not during a downtime event), client terminals 160 are in communication with the client servers 150, which provide various services to the client terminals 160 and organize interactions between client terminals 160. The client servers 150 are also in communication with remote services, such as those provided by the provider server 170, which are disseminated to the client terminals 160. In various aspects, client terminals 160 include laptop computers, desktop computers, mobile computers (e.g., tablets, smart phones), and other computing devices, which are discussed in greater detail in regard to FIG. 5.

One service provided by the client server 150 is registration, which includes the creation, lookup, and assignment of identifiers to records. By managing registration services centrally, a facility can ensure that the same identifiers are repeatedly used for the same parties and that a given identifier is only used for one party or interaction. Each client terminal 160 is therefore in communication with the client server 150 so that identifiers are assigned and managed consistently throughout the electronic recordkeeping process. For example, a university with two client terminals 160 used to admit students to the university might assign the same SIN to different students or multiple SINs to one student if the client server 150 did not provide centralized management of identifiers. In another example, if a patient returns to a hospital for a follow-up screening, a client terminal 160 may assign the patient a new MRN, and cause difficulties in accessing the patient's medical records from previous visits, unless the client server 150 looks up the MRN for the patient and provides it to the client terminal 160 at the time of patient intake.

Many facilities keep records electronically, but when the client server 150 goes offline during a downtime event, those facilities must turn to alternate means to continue the registration process for electronic records. Downtime events can be scheduled (e.g., patching software on the client server 150, replacing hardware), unscheduled (e.g., a crash of the client server 150, a power outage), or begin as scheduled and end as unscheduled (e.g., a scheduled downtime takes longer than expected), but in a downtime event that leaves the client terminals 160 online (e.g., via battery power in a power outage or unaffected by an update to the client server 150) the downtime event may still effectively disable the ability of the client terminals 160 to deal with electronic records; without the client server 150 to provide new identifiers when new identifiers are called for, or the correct previously-issued identifiers when previously-issued identifiers are called for, duplicative effort is required on the part of the client terminals 160. Operators of client terminals 160 may have to reenter information for records manipulated (e.g., newly opened or previously opened and newly modified) during a downtime event, introducing errors and increasing the processing load of the client servers 150 and client terminals 160. For example, a patient who is admitted to a hospital during a downtime event may be assigned a temporary-MRN so that a medical chart may be created for the patient. Once the downtime event ends, the operators who track the patient will need to determine whether to issue a new MRN for the patient, or reuse an existing MRN (if the patient had previously been issued an MRN by the hospital), and reenter all the data for the patient's records under the non-temporary-MRN for the patient.

During normal operation (i.e., not during a downtime event), the client terminals 160 receive enhanced services from the provider facility 120, via a provider server 170. Examples of enhanced services include, but are not limited to: providing a vehicle history report, providing a background check, providing a credit check, looking up an insurance policy, verifying credit hours earned at another educational institution, etc. These enhanced services may be provided to the client terminals 160 via a thin client, operating on a web client, to provide the client facility 110 with additional or more information on the parties being served at the client facility 110 than has been collected by operators at the client facility 110, thus saving labor and reducing the possibility for conflicting information being entered (e.g., by mis-entry of correct information or entry of incorrect information) into the systems of the client facility 110. For example, a client terminal 160 at a car dealership may receive enhanced services related to vehicle history, insurance information, and credit history so that a trade-in offer and financing may be presented to a potential car-buyer by only entering a VIN and a driver's license number for the potential car-buyer. The enhanced services obviate the need for repetitive data entry at multiple facilities, and centralize any calculations that need to be performed on those data for a client at the provider facility 120, thus reducing the amount of data that needs to be transmitted.

The client terminals 160 will post data to the provider server 170, which will use the posted data to find requested data held internally by the provider facility 120 and held externally by third party facilities 130, and perform any formatting or processing needed. The provider server 170 will postback data to the client server 150 for use by the client terminals 160 according to the record keeping system managed by the client server 150.

In one example, wherein the client server 150 manages a Hospital Information System (HIS) for a hospital, the client terminals 160 may be used for patient intake and will post data to an enhanced service provider's provider server 170 to request insurance information to see what services will be covered under the patient's insurance plan. The data posted to the provider server 170 in this example include a patient name, an insurance policy number, a medical condition of the patient (e.g., an ICD-9 or ICD-10 code) and identifiers for the patient used by the client server 150 (e.g., an MRN and an account number). The data posted back to the client server 150 in this example would include data on what extent given procedures related to the patient's medical condition will be covered by the patient's insurance policy, and may include previous medical records from other medical facilities related to the patient's medical condition.

In another example, wherein the client server 150 manages a university's student registration system, the client terminals 160 may be used to add incoming freshmen and transfer students to the university's Student Record System (SRS). The SRS will assign one SIN to each student as they are added by the client terminals 160, and the data posted back to the SRS for a given student from an enhanced services provider (e.g., grades from another institution qualifying for transfer credit) will be associated with the student's SIN in the SRS.

During a downtime event, however, the provider facility 120 enables the client terminals 160 to engage in the registration and lookup procedures normally handled by the now-offline client server 150. As will be appreciated, by employing the present disclosure, a client facility 110 may reduce the amount of hardware it maintains for fallback or backup purposes (e.g., a backup client server 150), and its downtime event responsiveness will be more robust to geographic problems, such as power outages. The provider server 170 is located under the control of a separate facility than the client server 150, and thus is less likely to be vulnerable to localized geographic hazards at the same time as the client server 150.

Figure 2:
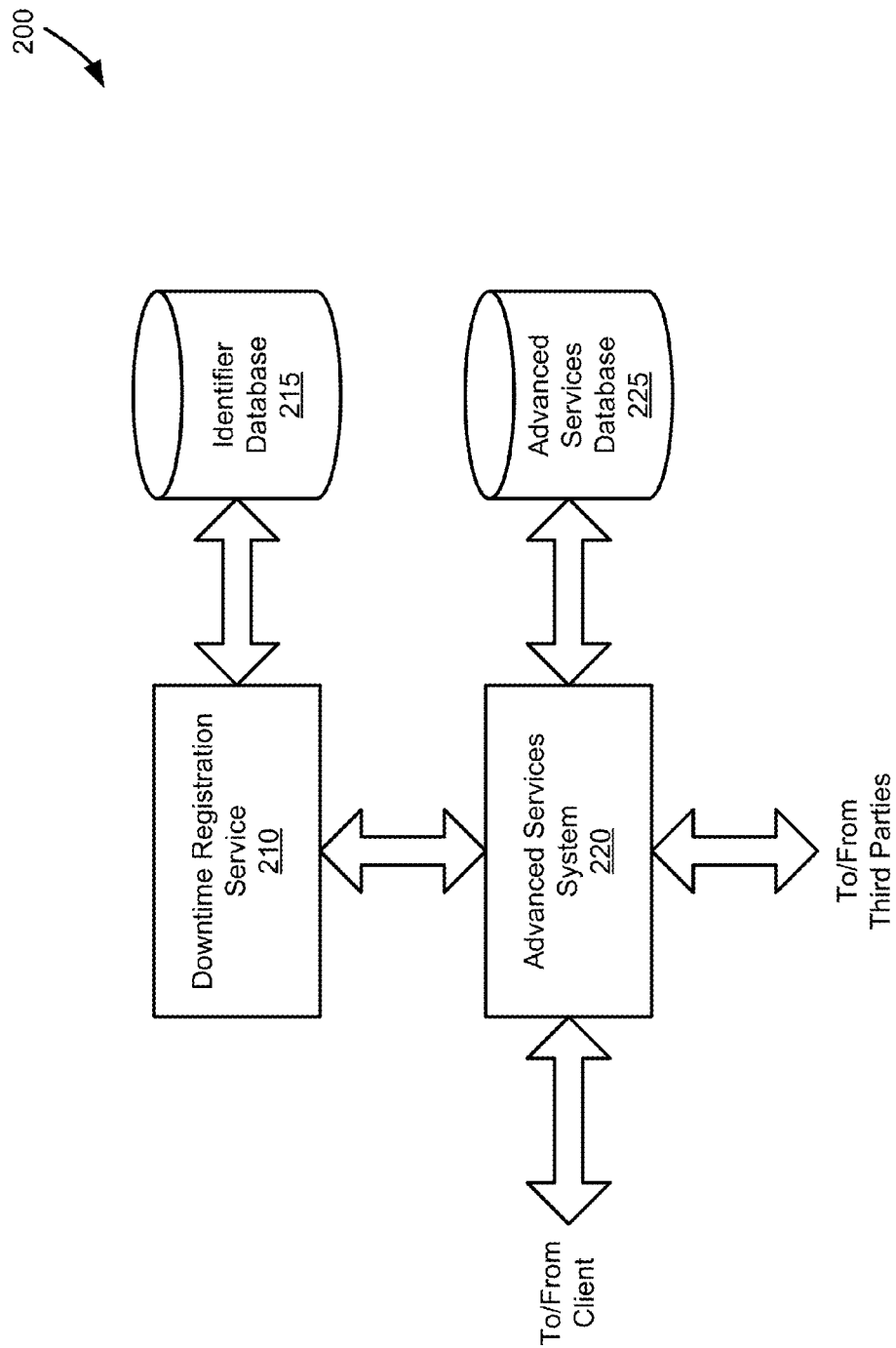
FIG. 2 is a block diagram of the systems of a provider server.

FIG. 2 is a block diagram of the systems 200 of a provider server 170. The systems 200 include the software and hardware components of a computing device 500, discussed in greater detail in FIG. 5, as well as the downtime registration service 210, the advanced services system 220, to provide the advances services to which the client is subscribed, an identifier database 215, for use by the downtime registration service 210 in assigning identifier appropriate to the client, and an advanced services database 225, to store records used by the advanced services system 220. In various aspects, these components may be executed in software on the provider server 170, in software as a distributed system in the provider facility 120, as dedicated hardware in the provider server 170 (e.g., a system-on-a-chip, a client-specific hard drive), as dedicated hardware in a distributed system in the provider facility 120, and combinations thereof.

As will be appreciated, the components illustrated in FIG. 2 are in communication with each other, the client, and/or third parties according to various hardware and software interfaces. One of ordinary skill in the art will be familiar with various transmission media, communications standards, and hardware devices useful to place the components in communication with each other and outside parties. For example, the components may be executed by instructions included on a computer readable storage medium and communicate via one or more Application Programming Interface (API). In another example, the advanced services system 220 may include hardware drivers, to control hardware devices, such as network interface card, to communicate remotely with the client facility 110 or the third party facility 130 over the network 140.

The advanced services system 220 is made available to the client facility 110 by the provider server 170 to provide supplemental data to the client's data entry. For example, a hospital client may use advanced services for insurance eligibility lookup (inputting patient identifiers and insurance information to receive supplemental data on procedure eligibility), an academic client may use advanced services for class credit transfer eligibility lookup (inputting student identifiers and other institution identifier to receive supplemental data on transfer eligibility), and an automotive sales or repair client may use advanced services for vehicle history lookup (inputting a VIN or license plate number to receive accident and ownership histories). In various aspects, the advanced services system 220 may be provided to the client remotely via a client terminal 160 acting as a "thin client"; posting data to the advanced services system 220 via a web browser session and receiving responsive data from the advanced services system 220 via postback during normal operation. In alternative aspects, a dedicated software application may be run on the client terminal 160 to communicate with the advanced services system 220. In some aspects, information included via postback includes eligibility information and responses that are specific to the advances services that the client terminal 160 access (e.g., address information, medical necessity, patient/guardian authorization for service, etc.). In addition or alternatively, a summary of eligibility responses for the advanced services may be posted back in a comment section of the client server 150 or client records, if requested by the client.

The advanced services system 220 is in communication with third parties, the downtime registration service 210, and the advanced services database 225. During normal operation, the advanced services system 220 receives client records from the client and uses those data to seek additional data to supplement the client's records, and will post the supplemental data back to the client once they have been found. The advanced services system 220 uses the data contained in the client records, including identifiers, to check for additional records held by third parties (e.g., an insurance provider, a second educational institution, a department of motor vehicles) that contain supplemental data relevant to the advanced services provided to the client. For example, an advanced services system 220 providing clients with supplemental data on procedure eligibility for a patient's medical insurance plan will receive patient identifiers and a condition (e.g., an ICD-10 code) from a client, and will use those identifiers to communicate with third parties who are insurance providers to lookup a policy number for the patient and what benefit options for treatment of the given condition are covered by the patient's policy, and will transmit the results to the client.

The advanced services system 220 stores its results in an advanced services database 225 for postback to the client, and, in some aspects, also stores the data received from the client terminal 160 used to look up supplemental data for the advanced services in the advanced services database 225. During normal operation, these data may be deleted from the advanced services database 225 according to a schedule (e.g., data are retained for x hours) or queue (e.g., only the last x records and their associated data are stored). When the client system is experiencing downtime, however, these data are retained at least until they have been posted back to the client server 150 after the conclusion of the downtime event. During a downtime event, when postback is disabled, records are created from the data received from the client and at least one identifier selected by the downtime registration service 210. The records may also include the results provided in relation to the advanced services, or the results from the advanced services may be stored separately. In various aspects, once the data are posted back to the client, the records are removed from the advanced services database 225, while in other aspects, those records and results are stored after postback to enable the advanced services system 220 to locally lookup and reuse the records or results to the client without querying the third parties again.

When a record is created during downtime, the downtime registration service 210 will determine which identifiers to associate with the record. Depending on the entity being registered during downtime, and the client's policies, the downtime registration service 210 will determine whether to reuse an existing identifier or assign a new identifier to the record for each identifier required by the record. For example, if an existing student registers for second year classes during a downtime event, an educational institution's polices may state that a SIN (local identifier) is to be reused for that student, but a new semester identifier (event identifier) is to be assigned, and the downtime registration service 210 will return the student's SIN and create an appropriate semester identifier. These identifiers are passed to the advanced services system 220 and are associated with the data received from the client as a record stored in the advanced services database 225 until postback is reenabled.

The downtime registration service 210 uses the identifier database 215 to assign the identifiers during downtime. In various aspects, the identifier database 215 may be an electronic database holding a pool of available local identifiers and/or event identifiers that are set aside by the client for use in case of a downtime event. In other aspects, the identifier database 215 may store a list of identifiers that the client has already used in generating records during normal operation (and those that the downtime registration service 210 has generated during downtime) so that the downtime registration service 210 can re-select identifiers that are to be re-used and not select identifiers that are meant to be unique. The client may specifically transmit a range of identifiers for use as a pool of downtime identifiers, or the downtime registration service 210 may parse the most recently assigned identifiers from the communications sent to the advanced services system 220 to keep an updated tally of what identifiers have been used and what values for identifiers are still available. When initially set up, the identifier database 215 is populated with a master record index list so that any identifiers that have been used previously by the client will be available to the downtime registration service 210 when the client server 150 is offline. The identifiers that have already been used may be searched by the downtime registration service 210 for reuse or to affect the value of newly assigned identifiers (e.g., so that the next newly assigned new identifier is sequential to the previously assigned identifier).

Figure 3A:
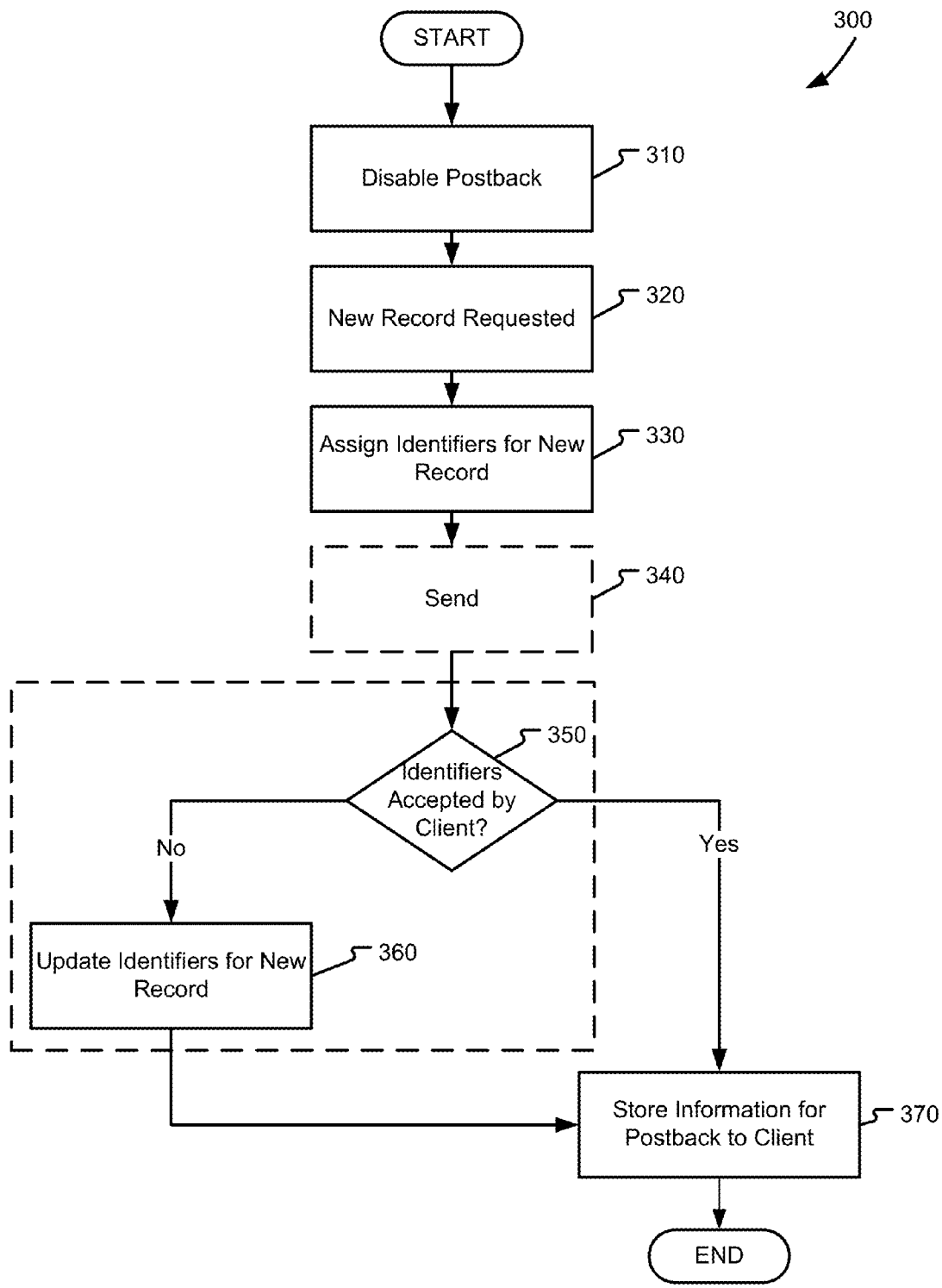
FIG. 3A is a flow chart showing general stages involved in an example method for providing registration during a downtime event.

FIG. 3A is a flow chart showing general stages involved in an example method 300 for providing registration during a downtime event. Method 300 begins when the provider facility 120 receives a communication to disable postback for advanced services to the client facility 110 at OPERATION 310. The advanced services that the provider facility 120 enables the client to use are delivered, in part, via postback to the client facility 110 in response to requests from the client server 150. Because the client server 150 is non-responsive during a downtime event, postback is disabled to reduce the amount of bandwidth and processing power used during downtime, as any messages sent to the client server 150 during downtime would either be queued until downtime ends, be returned as undeliverable to the provider server 170, or would be lost and require retransmission. The disabling of postback is used by the provider facility 120 as a signal that the client facility 110 will be relying on the advanced service provider to perform registration coordination for the client facility 110 until the downtime event is over. In alternative aspects, where no client server 150 is used to organize records for the client facility 110, postback may be permanently disabled, so that the provider facility 120 performs all record registration tasks for the client facility 110.

In various aspects, postback may be disabled in anticipation to or in response to a downtime event taking the client server 150 offline. For example, postback may be disabled x minutes before the client server 150 is taken offline due to planned downtime events, such as, for example, a software update, a hardware update, or a maintenance events. Conversely, postback may be disabled at the outset of a downtime event or x minutes after the downtime event begins (for example, to allow the client server 150 time to recover before beginning method 300) in the event of an unplanned downtime event, such as, for example, a software crash, a hardware failure, or a power outage.

At OPERATION 320, a request for a new record made from a client terminal 160 is received by the provider server 170. In various aspects, a new record may be requested when, for example, a patient is admitted to a hospital for treatment, a vehicle is received by a mechanic for services, a student is enrolled in a school, etc. The operator of the client terminal 160 will select a new record option in a software package in communication with the provider facility 120, for example, eCare NEXT®, (provided by EXPERIAN HEALTHCARE of FRANKLIN, Tenn.), and the operator can begin to enter data for the record in the software package. Once a registration dataset has been entered in the new record, those data are transmitted to the provider server 170. As will be appreciated, because the client server 150 is experiencing a downtime event while the terminals are still active, the new record creation request and the registration dataset will be communicated to the provider server 170 instead of to the client server 150.

In various aspects, what constitutes the registration dataset will vary based on client preferences, the type of record being opened, and the advanced services that are provided to the client. The registration dataset represents a minimal set of data that can be used by the advanced service provider to determine whether to assign new identifiers to the record or to reuse existing identifiers. For example, when the advanced services provided are for insurance policy eligibility lookup, a registration dataset for patient admission at a first client facility 110 of a hospital may include an insurance group number and a patient name, while a minimum data set for patient admission at a second hospital client facility 110 will also include a SSN (based on the second client's preferences). In another example, when the advanced services provided are for vehicle history lookup, a registration dataset may be a VIN or a license plate number, depending on client preferences. In yet another example, when the advanced services are for class-credit transfers between educational institutions, the registration dataset may be an SSN for a student and a second educational institution's name (or other identifier). The registration dataset may include a global identifier by which other identifiers and information may be looked up, may include a local identifier by which other identifiers and information may be looked up, or may include two or more elements of Personally Identifiable Information (PII) (e.g., name, address, telephone, email, spouse's name, personal health information (PHI)) by which identifiers and other information may be looked up.

Method 300 then proceeds to OPERATION 330, where identifiers for the party or event in the record are assigned for the new record by the provider server 170. The provider server 170 will use the request dataset to determine whether existing identifiers are to be used or new identifiers are to be assigned for the records. Depending on how the client facility 110 keeps records, local identifiers and/or event identifiers may be reused across multiple records, and if new identifiers are assigned to a party when identifiers are to be reused, records for a single will be spread across multiple entries, which will result in incorrect data for the party and labor to correct the records. Therefore, the provider server 170 is operable to use the registration dataset to search its records and records held at third party facilities 130 to search for instances where the party identified in the registration dataset is referred to with an identifier from the client facility 110. When no identifiers are found, new identifiers will be assigned for the new record, while if identifiers are found, they will be used (based on client preferences) in assigning identifiers to the new record. This process is discussed in greater detail in regard to FIG. 4.

Identifiers that are appropriate for the client facility 110 are defined by the preferences of each client facility 110, and may specify whether global identifiers, local identifiers, or event identifiers are called for, the styles of those identifiers, and whether those identifiers are ever reused. For example, a university may specify that a ten-digit (0-9) SIN is assigned to enrolling students when creating a new record, whereas a mechanic's shop may specify that an eight-digit (0-9) local identifier of a customer number and a four-letter (A-Z) event identifier are assigned to incoming vehicles, and a hospital may specify a ten-character (0-9 and A-Z) MRN and a five-digit (0-9) account number are assigned to incoming patients.

Once the identifiers for the new record are selected by the provider server 170, they are transmitted back to the client terminal 160, where they may be used by the operator as additional data are collected. In various aspects, during the downtime event, the operator will input additional data for an entity in a record. If these data are input, they are received in OPTIONAL OPERATION 340. As will be appreciated, the downtime event may end before information other than the registration dataset is input by an operator, in which case, OPTIONAL OPERATION 340 will not occur. Non-registration dataset information includes, but is not limited to: demographics (e.g., names, mailing addresses, phone numbers), payment information (e.g., credit card number, bank routing number, insurance carrier information), encounter information (e.g., ICD-10 (International Classification of Diseases, revision ten) codes, OBD-II (On Board Diagnostic, revision two) codes), notes, and other data not specified in (or duplicative of) the registration dataset. In some aspects, as data are received in OPTIONAL OPERATION 340, method 300 may proceed to OPTIONAL DECISION 350, where it is determined whether the identifiers have been accepted by the client, otherwise, method 300 proceeds to OPERATION 370.

At OPTIONAL DECISION 350, it is determined whether the identifiers have been accepted at the client facility 110. In various aspects, this determination is made by receiving an acceptance or rejection communication from the client, monitoring any print commands from the software used on the client terminals 160, or monitoring a timer to measure a preset time to assume that the identifiers have been accepted. Until the identifiers have been accepted by the client, the identifiers will be treated as unaccepted, and may be modified, as they are assumed to not yet have been used in a permanent medium (e.g., a printout, a medical bracelet, or a work order) or have not been recognized by the operator or party as correct. When an identifier has not yet been accepted by the client (or has been rejected), method 300 will proceed to OPTIONAL OPERATION 360 where the identifiers for the new record will be updated. In various aspects, updating the records will go through the same steps as illustrated in greater detail in FIG. 4, but with any additional data received from the client terminal 160 since the initial assignment of identifiers in OPERATION 330. OPTIONAL OPERATION 360 may result in the same identifiers being assigned to the record or different identifier (reused or new) being assigned to the record. Method 300 then proceeds to OPERATION 370.

At OPERATION 370, information received by the provider server 170 and identifiers assigned by the provider server 170 are stored at the provider facility 120 for postback to the client server 150 when the downtime event has concluded. The postback process at the conclusion of a downtime event is discussed in greater detail in regard to FIG. 3B.

Method 300 then concludes.

Figure 3B:
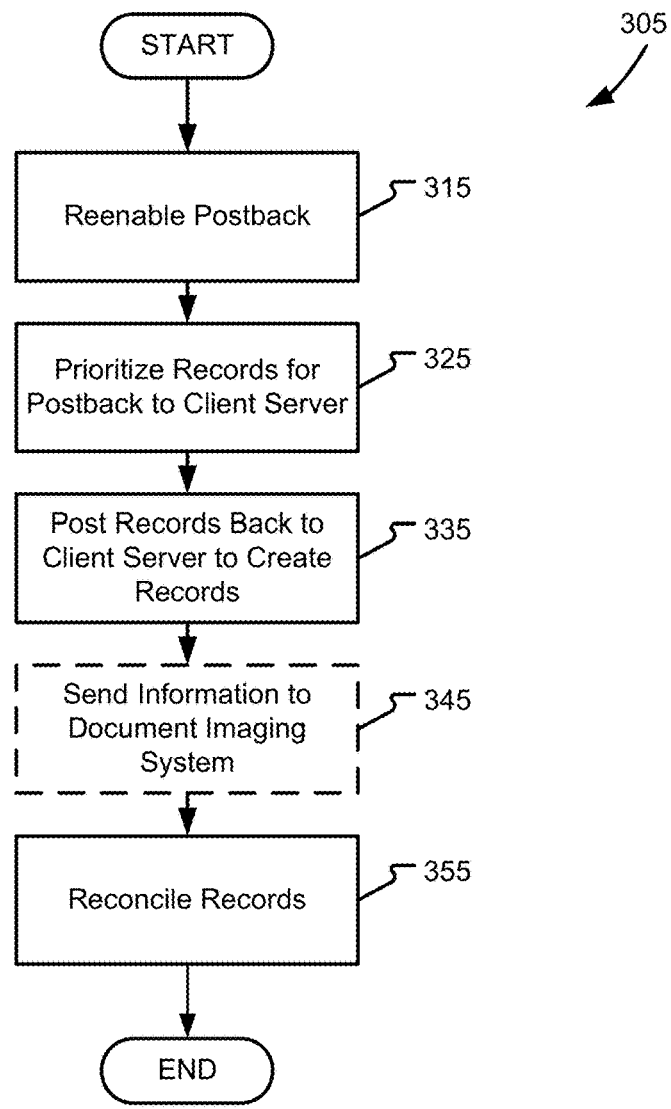
FIG. 3B is a flow chart showing general stages involved in an example method for providing registration when the downtime event has concluded.

FIG. 3B is a flow chart showing general stages involved in an example method 305 for providing registration when the downtime event has concluded. Method 305 begins at OPERATION 315 when the provider facility 120 receives a communication from the client facility 110 to reenable postback for advanced services, signaling that the downtime event has concluded and that normal operation is to resume.

Method 305 proceeds to OPERATION 325, where records created on the provider server 170 during the downtime event are prioritized for postback to the client server 150. In various aspects, the priority of postback may be initially set during the downtime event and adjusted periodically during postback once the downtime event has concluded. For example, as operators at the client facility 110 attempt to access individual records, those records may be prioritized for postback ahead of records that the operators have not yet attempted to access. In addition to prioritization of individual records, prioritization may also generally follow a first-in-first-out (FIFO) scheme or a last-in-first-out (LIFO) scheme, giving priority to the earliest-created or latest-created records on the provider server 170 respectively. As will be appreciated, a FIFO scheme provides the benefit of producing records on the client server 150 in the order in which the records were generated, while a LIFO scheme provides the benefit of giving the client server 150 a starting point from which to assign new identifiers to new records made once the downtime event is over.

At OPERATION 335, the provider server 170 posts records back to the client server 150 to create records on the client server 150. The records posted back to the client server 150 include the records entered at the client terminals 160 during the downtime event, which would include the information that would be entered into the client server 150 during normal operations. In various aspects, once a record has been posted back to the client server 150, the postback priority is deleted from the provider server 170, and the record is maintained on the provider server 170 to populate the advanced services with additional data. In various aspects, redundant records (i.e., records containing identical information) that were accepted during the downtime event are consolidated into a single record for postback, and copies of those records beyond the first are deleted from the provider server 170 to reduce memory usage and bandwidth needed to postback the records. For example, as the client terminal 160 transmits patient intake information, and patient processing information over the course of a downtime event, the record created at the provider server 170 for later postback may include each transaction in a single record (deleting extraneous header information and repeated data between the transactions), or treat each transaction as separate records as it receives them from the client terminal 160. In various aspects, the records may be consolidated by a global identifier, a local identifier, or an event identifier by the provider server 170 for postback or post-downtime event storage.

Optionally, method 305 proceeds to OPTIONAL OPERATION 345, where information is sent from the provider server 170 for a document imaging system of the client server 150. Any electronic documents created during downtime by the provider server 170 or by a client terminal 160 that were uploaded to the provider server 170, will be loaded in the document imaging system so the client facility 110 will have a version of those documents in a centrally managed file system. In various aspects, the documents may be loaded according to a FIFO or a LIFO scheme, with the associated benefits for document numbering inherent to those schemes, and the loading of a given document to the document imaging system may be prioritized due to a request to access or print that document from an operator. Documents may be sent to the document imaging system via postback, an API, or cold feed file.

Method 305 then proceeds to OPERATION 355, where the records are reconciled. In various aspects, because the operators at the client facility 110 may be making physical records in addition to electronic records communicated with the provider server 170 (e.g., taking paper notes on printouts of the electronic records), or transmission errors may occur during postback, the provider server 170 will transmit an audit report to the client server 150 that includes the identifiers for all records that were created during downtime. The audit report is used to compare the records held in the client server 150 to those transmitted by the provider server 170 to ensure that all the electronic records match. In various aspects, if a discrepancy is found between the two sets of records, operators at the client facility 110 will be alerted to choose which record will be finalized in the client server 150. In alternative aspects, operators from the client facility 110 are prompted to approve each record in the audit report before it is entered as a record in the client server 150. Additionally, when pools of identifiers are set aside for downtime events, the client server 150 and provider server 170 are also updated to set aside a new range of identifiers for the next potential downtime event.

Method 305 then concludes.

Figure 4:
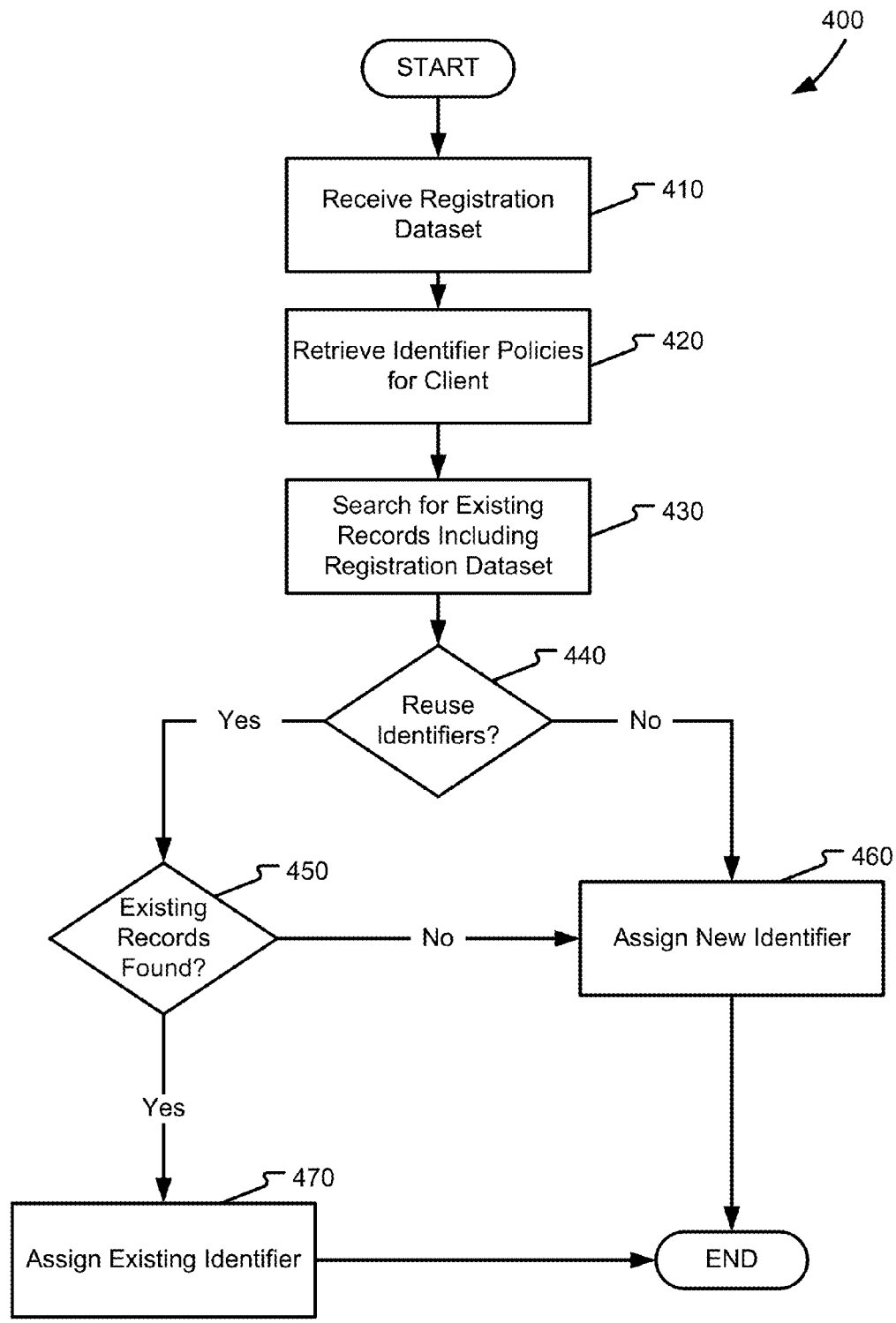
FIG. 4 is a flow chart showing general stages involved in an example method for assigning identifiers to records during a downtime event.

FIG. 4 is a flow chart showing general stages involved in an example method 400 for assigning identifiers to records during a downtime event. Method 400 begins at OPERATION 410 when a registration dataset is received by the provider server 170 during a downtime event. Method 400 then proceeds to OPERATION 420, where the provider server 170 retrieves the client's policies for how identifiers are to be assigned. The client's policies specify how many identifiers are needed when opening a record, the type (e.g., global, local, event) of those identifiers, the format of the identifiers (e.g., number of characters, which characters are numbers or letters, arrangements of characters), and whether a given identifier is to be reused across multiple records by the client.

At OPERATION 430, the provider server 170 searches for existing records that include data matching the data in the registration dataset to locate any identifiers that have previously been used by the client to refer to the party being registered during downtime (and any previous interactions with the client). The registration dataset, in various aspects, includes the data minimally needed to identify a party in existing records (e.g., a global identifier, a local identifier remembered by the party, two or more elements of PII), but in other aspects, as the operator inputs more data, the registration dataset may expand to include additional data. Individual items from the registration dataset are compared to the corresponding fields in the existing records which the service provider has access to, either in the service provider facility 120 or third party facilities 130. For example, with a registration dataset consisting of an SSN, the service provider will search for any records which also include that SSN. The (other) identifiers found in the records that include the information from the registration dataset are returned so that, depending on the client's policies, it will be determined whether to reuse that identifier or assign a new identifier.

For each identifier specified in the client's policies, it is determined at DECISION 440 whether to attempt to reuse an existing identifier or to assign a new identifier. When the client's policies state that a given identifier will be reused across interactions or records, method 400 will proceed to DECISION 450, where it is determined whether an existing record is found for a given identifier. When the client's policies state that a given identifier will not be reused across interactions or records at DECISION 440 or no record with an existing identifier is found at DECISION 450, method 400 will proceed to OPERATION 460. Otherwise, method 400 will proceed to OPERATION 470.

At OPERATION 460 the provider server 170 generates a new identifier, based on the format requirements in the client policies looked up in OPERATION 420, and assigns it to the new record requested by the client. In various aspects, where the client has specified that identifiers are to be sequentially assigned, (e.g., an event identifier for a first visit should be "0001", the event identifier for the second visit should be "0002", etc.), and an existing record was found in OPERATION 430, the new identifier assigned in OPERATION 460 will be based on the last-used identifier in an existing record. Method 400 then concludes.

When method 400 proceeds to OPERATION 470, the identifiers in the existing records, found in OPERATION 430 as determined in DECISION 450, are assigned to the new record requested by the client. Method 400 then concludes.

To further illustrate the execution of method 400, consider the example of a client hospital whose policies, looked up in OPERATION 420, specify that an MRN (local identifier) and an account number (event identifier) are to be assigned to each new record. In this example, the policies specify that the MRN is reused for a given patient across multiple visits to the hospital, and that the account number is to be assigned uniquely for each visit, regardless of patient. In this example, DECISION 440 will direct method 400 to proceed to DECISION 450 for the MRN and to OPERATION 460 for the account number. At DECISION 450, if it is determined that an existing record were found in OPERATION 430 that includes the information from the registration dataset, received in OPERATION 410, then method 400 would be directed to OPERATION 470, where the existing identifier is assigned to the new record. Otherwise, a method 400 would be directed to OPERATION 460 for the MRN, where a new MRN, appropriate to the client's policies, is assigned to the new record. At OPERATION 460, for the account number, the provider server 170 will assign a new account number to the new record, based on the client's policies and previously assigned account numbers (or a pool of account numbers not previously used).

Figure 5:
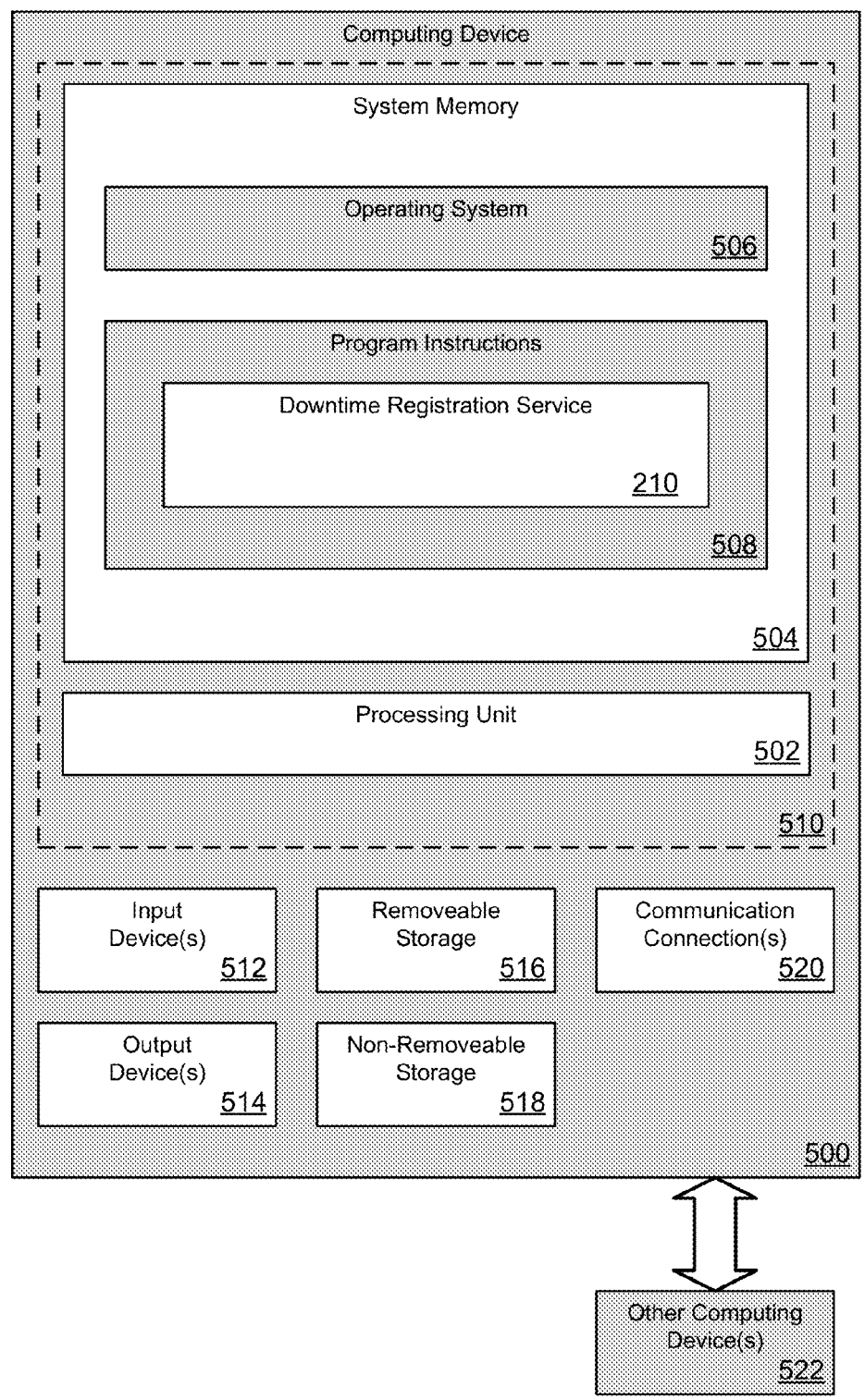
FIG. 5 is a block diagram illustrating physical components of an example computing device with which aspects may be practiced.

FIG. 5 is a block diagram illustrating physical components of an example computing device 500 with which aspects may be practiced. The computing device 500 may include at least one processing unit 502 and a system memory 504. The system memory 504 may comprise, but is not limited to, volatile (e.g. random access memory (RAM)), non-volatile (e.g. read-only memory (ROM)), flash memory, or any combination thereof. System memory 504 may include operating system 506, one or more program instructions 508, and may include a downtime registration service 210 having sufficient computer-executable instructions, which when executed, perform functionalities as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 may also include one or more input device(s) 512 (keyboard, mouse, pen, touch input device, etc.) and one or more output device(s) 514 (e.g., display, speakers, a printer, etc.).

The computing device 500 may also include additional data storage devices (removable or non-removable) such as, for example, magnetic disks, optical disks, or tape. Such additional storage is illustrated by a removable storage 516 and a non-removable storage 518. Computing device 500 may also contain a communication connection 520 that may allow computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for enabling registration according to client policies for a client system used for managing creation of client records for a client facility when a client server of the client system is experiencing a downtime event and non-responsive to manage creation of the client records, comprising:
   a processor; and
   a memory storage device including instructions that when executed by the processor are operable to provide:
      an advanced services system, in communication with client terminals and third parties, operable to receive registration requests from the client terminals and operable to request and receive supplemental data from the third parties related to the registration requests;
      an advanced services database, in communication with the advanced services system, operable to store information for postback to the client server once responsive after the downtime event;
      an identifier database, storing the client policies, wherein the client polices relate to how identifiers are used in the client records, wherein a type for the identifiers is set from a global identifier, a local identifier, and an event identifier by the client system; and
      a downtime registration service, in communication with the advanced services system and the identifier database, operable to provide the identifiers to the advanced services system to create a new record when the client server is non-responsive, wherein the new record is stored in the advanced services database for postback when the client server is responsive.

2. The system of claim 1, wherein the identifier database includes a pool of identifiers designated by the client system for use during the downtime event, wherein the downtime registration service provides the identifiers from the pool of identifiers to one or more of the third parties.

3. The system of claim 1, wherein the identifier database includes a last-used identifier, wherein the downtime registration service provides the identifiers based on the last-used identifier.

4. The system of claim 3, wherein the last-used identifier is parsed by the downtime registration service from the advanced services system during normal operation.

5. The system of claim 1, wherein the identifier database includes a master record index, to indicate, to the downtime registration service, previously-used identifiers that have been used by the client system.

6. The system of claim 1, wherein the information stored for postback to the client system is consolidated by the local identifier by the advanced services database on postback.

7. A method for enabling registration according to client policies for a client system used for managing creation of client records for a client facility when the client system is experiencing a downtime event and not available to manage creation of the client records, comprising:
   in response to receiving a request to turn off postback, turning off postback to the client system;
   while postback is turned off:
      receiving a message, including a registration dataset, requesting creation of a new record;
      retrieving the client policies;
      creating the new record in accordance with the client policies while the client system is unavailable by:
         selecting, based on the client policies and the registration dataset, whether to reuse a previous identifier for a subject of the new record or generate a new identifier to use as an identifier for the subject of the new record;
         assigning the identifier and the registration dataset to the new record;
         locating supplemental information for the new record based on the registration dataset, wherein the supplemental information includes information about the subject of the new record that was not included in the registration dataset;
         associating the supplemental information with the new record; and
         storing the new record; and
   in response to receiving a request to restore postback, turning on postback to the client system and transmitting the new record to the client system.

8. The method of claim 7, wherein the client policies set a type for the identifier, wherein the type is chosen from a global identifier, a local identifier, and an event identifier.

9. The method of claim 7, wherein the registration dataset includes a global identifier for the subject of the new record.

10. The method of claim 7, wherein a first new record and a second new record are created while postback is turned off, and prior to transmitting the first new record and the second new record to the client system, a priority is set for transmission of the first new record and the second new record that specifies an order of transmission.

11. The method of claim 7, wherein the new record is transmitted to a document imaging system associated with the client system.

12. The method of claim 7, wherein, prior to assigning the identifier to the new record, requesting operator approval of the identifier, wherein when operator approval is received, the identifier is assigned to the new record.

13. The method of claim 7, wherein the client policies specify multiple identifiers to be assigned to one record.

14. The method of claim 7, wherein transmitting the new record to the client system further comprises transmitting the new record to a document imaging system.

15. The method of claim 7, further comprising: after transmitting the new record to the client system, reconciling records for the client system by transmitting an audit report to the client system that includes identifiers for all of the records that were created while postback was disabled.

16. A system for providing advanced services to a client facility that is further operable to enable registration according to client policies for a client system used for managing creation of client records for the client facility when the client system is experiencing a downtime event and not available to manage creation of the client records, comprising:

a processor; and a memory storage device including instructions that when executed by the processor cause the system to be operable to perform the steps of:

determine when a client server is experiencing downtime and when the client server is no longer experiencing downtime, wherein the client server is operable to control and manage record creation for the client facility;

when it is determined that the client server is experiencing downtime:

disable postback of advanced services to the client server;

receive a request from a client terminal to create a record for an entity, wherein the request includes a registration dataset associated with the entity;

determine whether the entity has previously been assigned an existing identifier by comparing the registration dataset to existing records, wherein, when it is determined that the existing records include data that match the registration dataset, an existing identifier included in the existing records is selected as an identifier for the entity and when it is determined that the existing records do not include data that match the registration dataset, a new identifier is assigned as the identifier for the entity; and create a record for the entity with the identifier and data received from the client terminal related to the entity, including the registration dataset; and when it is determined that the client server is no longer experiencing downtime:

reenable postback of the advanced services to the client server; and transmit the record created while the client server was experiencing downtime to the client server.

17. The system of claim 16, wherein the system is further operable to perform the steps of:

when it is determined that the client server is experiencing downtime, assign an event identifier to the record.

18. The system of claim 16, wherein the registration dataset includes a global identifier for the entity.

19. The system of claim 16, wherein to transmit the record to the client server includes transmission of an audit report that includes identifiers for all of the records that were created during the downtime.

* * * * *